(12) United States Patent
Zuehl et al.

(10) Patent No.: US 7,093,701 B2
(45) Date of Patent: Aug. 22, 2006

(54) BRIDGING CLUTCH FOR A CLUTCH APPARATUS WHICH HAS A HYDRODYNAMIC CIRCUIT IN A CLUTCH HOUSING

(75) Inventors: Carsten Zuehl, Troy, MI (US); Jason Kehrer, Troy, MI (US); Claus Umnus, Troy, MI (US)

(73) Assignee: ZF Friedrichshafen AG, Friedrichshafen (DE)

( * ) Notice: Subject to any disclaimer, the term of this patent is extended or adjusted under 35 U.S.C. 154(b) by 100 days.

(21) Appl. No.: 10/919,073

(22) Filed: Aug. 16, 2004

(65) Prior Publication Data
US 2005/0039998 A1 Feb. 24, 2005

(30) Foreign Application Priority Data
Aug. 20, 2003 (DE) ............................. 103 38 157

(51) Int. Cl.
F16H 45/02 (2006.01)
(52) U.S. Cl. .................... 192/3.29; 192/70.19
(58) Field of Classification Search ............... None
See application file for complete search history.

(56) References Cited

U.S. PATENT DOCUMENTS

| | | | | | |
|---|---|---|---|---|---|
| 5,826,690 | A | * | 10/1998 | Maingaud et al. | 192/3.29 |
| 6,065,577 | A | * | 5/2000 | Arhab et al. | 192/3.29 |
| 6,079,530 | A | * | 6/2000 | Arhab | 192/3.29 |
| 6,640,945 | B1 | * | 11/2003 | Arhab et al. | 192/3.29 |
| 2002/0134632 | A1 | | 9/2002 | Arhab et al. | |
| 2003/0173175 | A1 | * | 9/2003 | Tomiyama | 192/3.29 |

* cited by examiner

Primary Examiner—Rodney H. Bonck
(74) Attorney, Agent, or Firm—Cohen, Pontani, Lieberman & Pavane

(57) ABSTRACT

A bridging clutch for a clutch apparatus which has a hydrodynamic circuit in a clutch housing. The bridging clutch may have a piston which is arranged on a hub and which is connected to a piston mount, which is mounted on the clutch housing, such that it can be moved axially via axial force stores. The piston mount has cutouts between radial extensions in the circumferential direction for projections which are provided on the piston and which pass through the piston mount. Axial force stores engage behind the piston mount on its side facing away from the piston and are attached to the piston at one connecting end and have lever ends which act on contact surfaces of the piston mount with predetermined prestressing in the direction of the piston.

33 Claims, 9 Drawing Sheets

BRIDGING CLUTCH FOR A CLUTCH APPARATUS WHICH HAS A HYDRODYNAMIC CIRCUIT IN A CLUTCH HOUSING

PRIORITY CLAIM

This application claims priority under 35 U.S.C. §119 to German application, DE 103 38 157 filed Aug. 20, 2003.

FIELD OF THE INVENTION

This invention relates to a bridging clutch.

BACKGROUND OF THE INVENTION

A bridging clutch such as this is known, for example, from U.S. 2002/0134632 A1. The bridging clutch is held in a clutch housing of a hydrodynamic clutch apparatus, which is in the form of a torque converter and in consequence is provided with a pump wheel, a turbine wheel and a guide wheel to form a hydrodynamic circuit. The bridging clutch has a piston, which is mounted on a hub and is held via axial force stores on a piston mount such that they rotate together but can be moved axially. The piston mount is on the one hand attached to a housing cover of the clutch housing by means of spot welds, and on the other hand firmly holds the hub, to which the piston is fitted, likewise via spot welds. A clutch disk which is provided with two or more friction surfaces is provided axially between the piston and the housing cover and is connected by means of a holder to a turbine shell of the turbine wheel such that they rotate together.

Since the connection of the piston to the piston mount and hence to the housing cover such that they rotate together is provided by means of the axial force stores, it is possible for their respective deformation states to influence the readjustment of the rotation of the piston with respect to the clutch housing. On the other hand, when a torque is being transmitted via the bridging clutch, it is impossible to preclude any undesirable influence on any prestressing of the axial force stores which may occur. The axial movement of the piston is also limited with this design configuration by the axial force stores.

SUMMARY OF THE INVENTION

The invention may provide a bridging clutch in which a piston is driven exactly both in the circumferential direction and in the axial direction with respect to a clutch housing, and in which any axial deflection movement is limited by simple design means.

The design of the piston mount with cutouts for projections which are provided on the piston (since these projections in each case engage between radial extensions on the piston mount in the circumferential direction) results in a connection, which acts in the circumferential direction, between the piston and the piston mount, in which case, provided that there is no play in the circumferential direction between the projections and the respectively associated cutout, said connection is essentially made in such a way that they rotate together. The axial force stores, in contrast produce a connection which acts in the axial direction between the piston and piston mount, in which case this connection can be produced with a predetermined prestress. This prestress is, of course, dependent on the axial force stores being deflected beyond their null position in which there is no stress when they are in their operating position according to the claim, and being held in contact with the piston by the prestressing that is produced in this way, by means of an axial force, which is associated with the prestressing, on the piston mount. A design such as this is particularly advantageous when the piston mount is mounted on a component of the clutch apparatus in such a way that the prestressing of the axial force stores loads the piston in the direction of the friction surfaces of the bridging clutch.

If the axial force stores, which are attached by a connecting end to the piston, act with their lever ends, which are in each case at the opposite end of the connecting end, on the piston mount, it is advantageous to provide those contact surfaces which are required for the lever ends on a component of the piston mount which is present in any case, for example on radial extensions which run essentially radially outwards, starting from a hub of the piston mount. In order to reduce the amount of material and hence the mass, it is sufficient for only those radial extensions which are in each case associated with one of the axial force stores to be designed with contact surfaces. In contrast, the other radial extensions on the piston mount can be designed to be radially shorter and thus provide a space which can be used, for example, by the axial force stores. It is sufficient in this case for the second radial extensions, which are shorter than the first radial extensions, actually to be continued radially outwards until preferably their entire surface area is available to the respectively adjacent projection on the piston.

The first radial extensions, in particular, may advantageously carry out an additional function in that, on the one hand, they are designed with a guide such that the axial force stores are held such that they cannot be moved and, on the other hand, have a securing stud which, together with the respective guide, effectively prevents the axial force store from sliding out of the guide.

The axial force stores may advantageously have associated stud elements which, by means of studs formed on them, can predetermine any axial play of the piston with respect to the piston mount and, in particular in this case, with respect to the radially shorter second radial extensions. The studs preferably engage over the associated second radial extensions so that, presupposing an axial movement by means of which the piston mount is moved away from the piston, they limit any axial movement on these studs, once any axial play with respect to the studs has been taken up. These studs can be provided on separate stud elements, and in this way are connected to the axial force stores, although these can likewise also be produced integrally with the axial force stores.

Turning back to the radial extensions, these need not necessarily have differential axial lengths. Embodiments are likewise possible in which all the radial extensions essentially have the same radial extent. Since, with a design such as this, no free space for accommodating axial force stores remains within the radial extent area of the radial extensions, the axial force stores must be provided elsewhere and, as claimed, this can be done by means of an annular area radially between the hub of the piston mount and the radial extensions, which preferably has recesses for axial force stores to pass through. While, in this last-mentioned design, the radial extensions advantageously form the radially outer edge of the piston mount, the radial extensions can be provided with a different extent in the radial direction, even in the radially central area of the piston mount.

The piston projections which engage in the cutouts between in each case two radial extensions may be forced out of the remaining piston areas by material deformation and, seen in the circumferential direction, form a tooth system on the piston which, with respect to the dimensions of and the distance between the projections, is matched to the cutouts in the piston mount, so that this tooth system on the piston engages with a predetermined amount of play in the circumferential direction in the mating tooth system which is formed by the radial extensions.

As already indicated, the axial force stores which act between the piston mount and the piston are attached by their connecting end to the piston, in which case this attachment can be provided by using attachment means. Attachment means such as these may be in the form of rivets, or else locking ring bolts. In contrast to a rivet, which is compression-loaded in both directions by virtue of the way it is manufactured, locking ring bolts can be installed from one side so that the connection between the axial force store and the piston within a clutch housing can be produced from one side, with the side which is more accessible in each case being preferred, of course. The piston mount can thus first of all be mounted on a housing cover of the clutch housing in order subsequently to insert a profiled pin of the locking ring bolt through a cutout at least in the connecting end of the axial force store, and then to allow it to pass through a recess in the piston. The connection between the axial force store and the piston can then be produced by pressure molding on a sleeve of the locking ring bolt with its profiled pin, to be precise from the turbine wheel side of the piston. The use of the locking ring bolts means that there is no need for any tools to enter the area between the axial force store and the housing cover during this production process.

Consistent use of the capabilities that result from the use of locking ring bolts leads to considerable design advantages. Thus, for example, when using locking ring bolts, the piston can be guided considerably further radially inwards since, as already mentioned, the connection between the piston mount and the housing cover is produced before the piston is attached to the piston mount, so that there is no longer any need for access to the connecting point between the piston mount and the housing cover from the turbine wheel side once the piston has been inserted. The piston, which is drawn radially further inwards, requires a centering hub with a considerably smaller radial diameter than is the case with a piston which uses rivets as the connecting means between the axial force store and the piston. The clutch apparatus can thus be designed such that it uses considerably less material and has considerably less inertia.

Further advantageous refinements of the bridging clutch according to the invention are claimed in the claims.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

The present invention will be described in detail in the following text using preferred embodiments and with reference to the drawings, in which.

DETAILED DESCRIPTION OF THE PRESENTLY PREFERRED EMBODIMENTS

Figure 1:
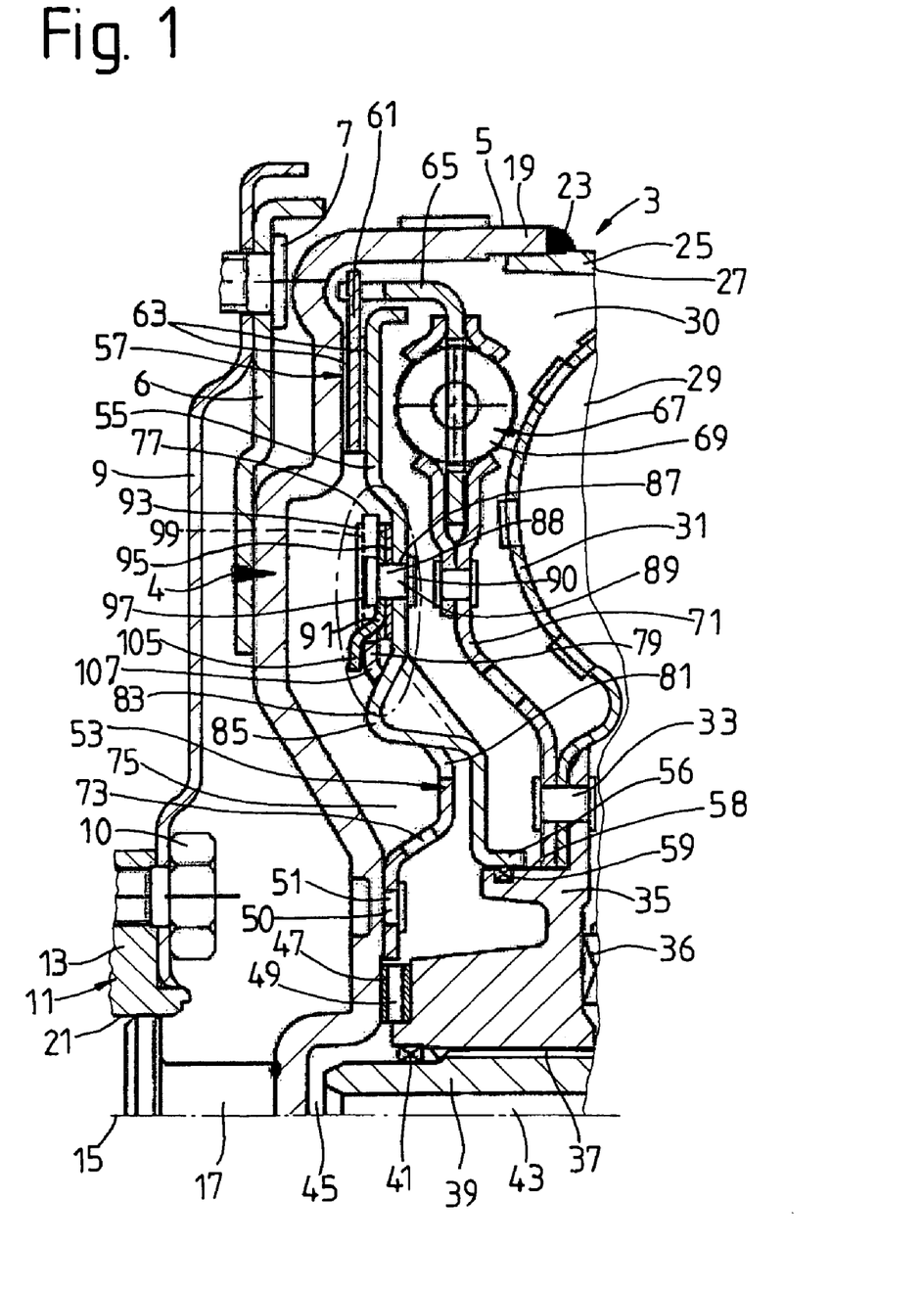
FIG. 1 shows a bisected longitudinal section view of the bridging clutch in a housing of a hydrodynamic clutch apparatus.

The clutch apparatus 3 as shown in FIG. 1 has a clutch housing 5 to which a connecting plate 6 is attached by means of a weld bead 4, and which connecting plate 6 can be coupled via two or more retaining elements 7 and a coupling element 9, such as a flexible plate, to a drive 11, for example to the crankshaft 13 of an internal combustion engine, such that they rotate together.

In the area of its rotation axis 15, the clutch apparatus 3 also has a bearing pin 17, which is provided on a housing cover 19 of the clutch housing and is held in a centering guide 21 that is provided on the drive 11.

The housing cover 19 is firmly connected via another weld bead 23 to a pump wheel shell 25 of a pump wheel 27 which interacts with a turbine wheel 29 and, possibly, with a guide wheel that is not shown, forming a hydrodynamic circuit 30. The turbine wheel 29 has a turbine wheel shell 31 which is attached by means of a riveted joint 33 to a turbine hub 35 which, via an axial bearing 36, makes contact with a freewheeling mechanism, which is not shown, for the already mentioned guide wheel. The turbine hub 35 is connected via a tooth system 37 to a transmission input shaft 39, which is arranged radially within the turbine hub, such that they rotate together, and has a seal 41 for this transmission input shaft 39. This transmission input shaft 39 has a center hole 43 which opens into an intermediate area 45 which is connected to a pressure chamber 75 by means of through-openings 49 in a housing hub 47 axially between the housing cover 19 and the turbine hub 35, and this pressure chamber 75 is provided axially between the housing cover 19 and a piston 55 of a bridging clutch 57. In a manner which will be described in more detail in the following text, the piston 55 has an associated piston mount 53 which is attached to the housing cover 19 by means of push-through riveting 51 in order to produce a connection 50 to the housing cover 19.

The piston 55 is held by means of a piston foot 56 (which is integrally formed radially on the inside) on a holder 58 on the turbine hub 35, sealed by means of a seal 59, with its radially outer area making contact with a friction lining 63 on a clutch disk 61, in which case this clutch disk 61 can be supported by means of a further friction lining 63 on a friction surface of the housing cover 19. The clutch disk 61 is connected to an input part 65 of a torsional oscillation damper 67 such that they rotate together, with this input part 65 being supported via a circumferential set of springs 69 on an output part 71 of the torsional oscillation damper 67. This output part 71 is in turn attached to the turbine hub 35 via the riveting 33.

Figure 2:
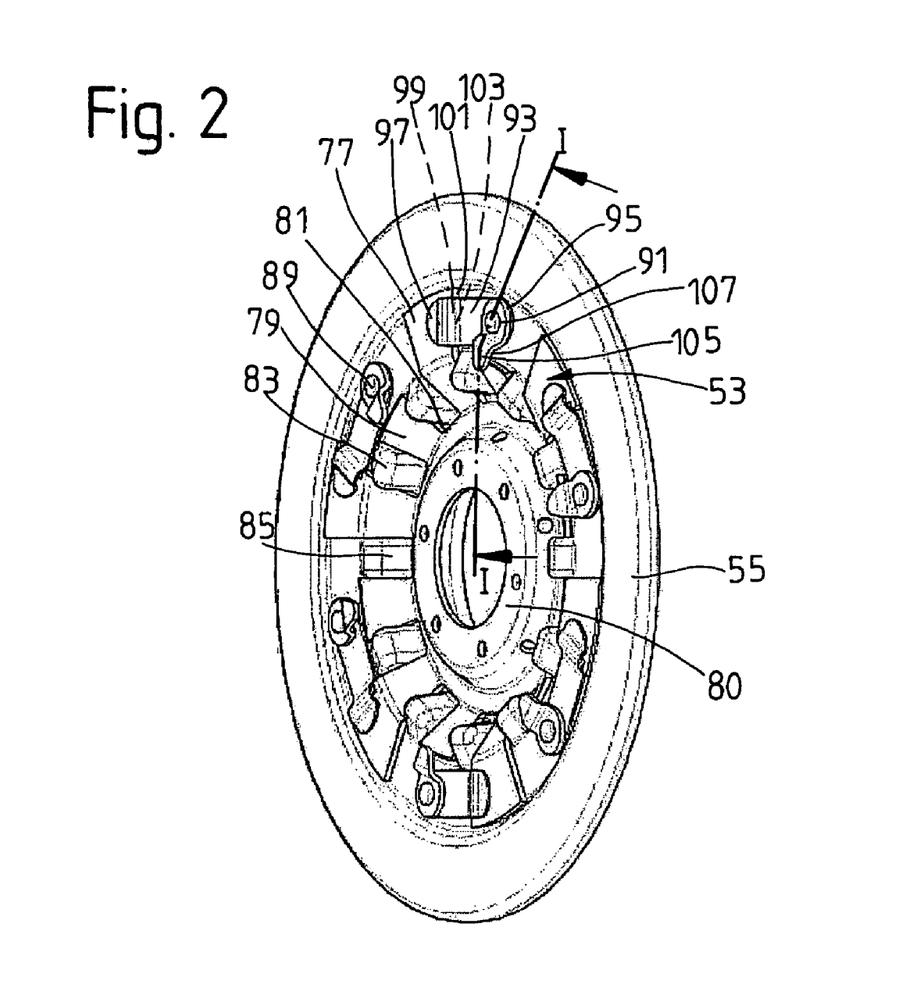
FIG. 2 shows a drawing of a part of the bridging clutch shown in FIG. 1, illustrated in perspective.
Figure 3:
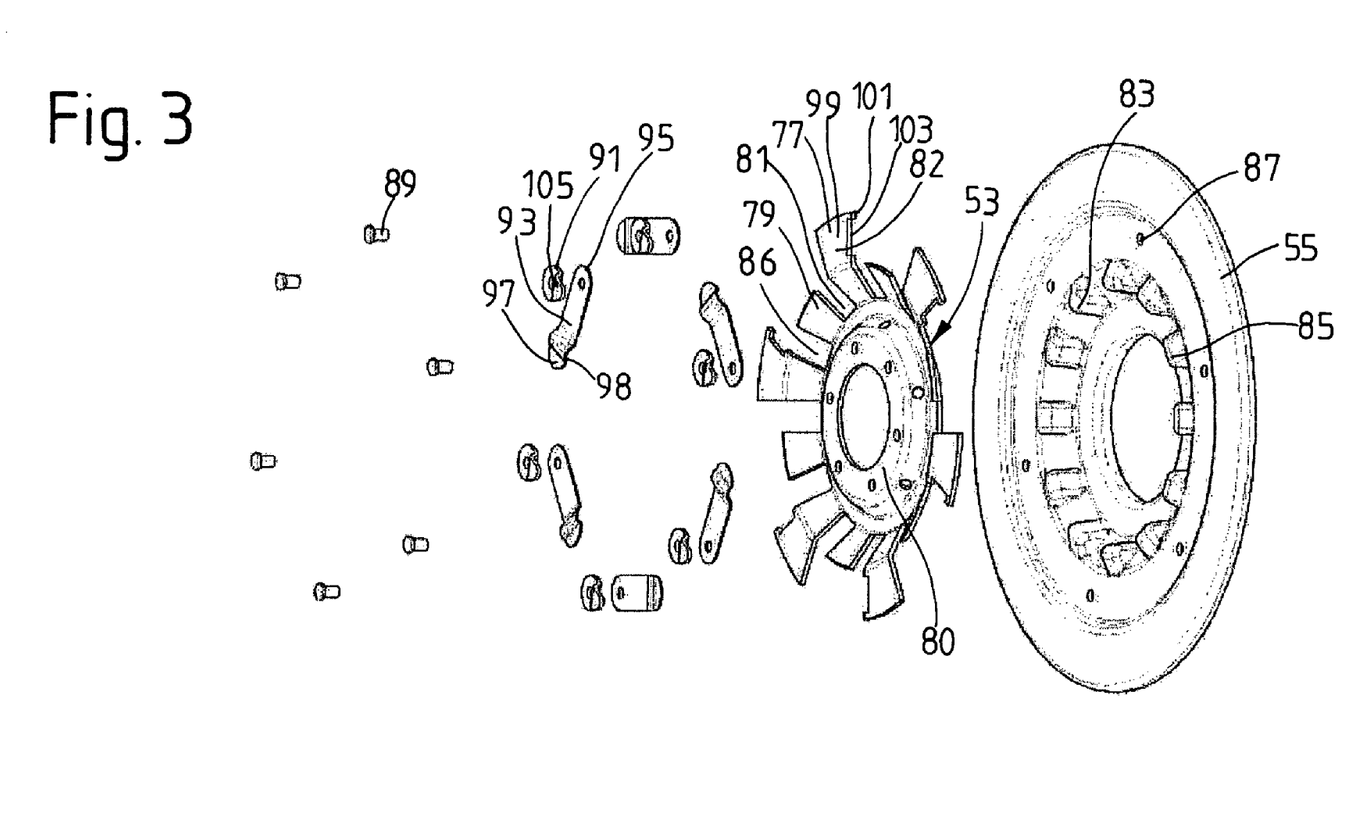
FIG. 3 shows an exploded drawing illustration of the bridging clutch shown in FIG. 2.

In order to describe the bridging clutch further, reference is made to FIGS. 2 and 3, which show drawings of the major components of the bridging clutch 57. The piston mount 53 thus has radial extensions 77, 79 which are integrally formed, alternately with one another in the circumferential direction, on a piston mount hub 80. The radial extensions in this case have different extents in the radial direction, with first radial extensions 77 being distinguished by a radial overhang 82 over the second radial extensions 79. A contact surface 99 is provided on each radial overhang 82, on its axial side facing away from the piston 55. Furthermore, a guide 103 is in each case provided on one of the circumferential sides of the respective radial overhang 82 and is radially limited on the outside by a securing stud 101, which points essentially in the circumferential direction. The operation of the contact surface 99, of the guide 103, and of the securing studs 101 will be described in more detail in the following text.

A cutout 81, in which projections 83 that are provided on the piston 55 engage, in each case remains between each two radial extensions 77, 79 in the circumferential direction. These projections 83 are preferably stamped in advance by means of plastic deformation on the piston 55 in the direction of the piston mount 53 and, seen over the entire circumference, form a tooth system 85, which engages in a mating tooth system 86 that is formed by the cutouts 81. By ensuring that there is no play in the circumferential direction between the tooth system 85 and the mating tooth system 86 as soon as the projections 83 on the piston 85 have been inserted into the cutouts 81 in the piston mount 53, this ensures that the piston 55 and the piston mount 53 are connected such that they rotate together.

Two or more retaining holes 87 are provided on the piston 55, and are intended for attachment elements 88 in the form of rivets 89. The rivets 89 pass through stud elements 91 as well as connecting ends 95 of axial force stores 93, before being located in the retaining holes 87 in the piston 55, in order to produce a connection 90. At their lever ends 97 which face away from the connecting ends 95, the axial force stores 93 are provided with pressure surfaces 98, which make contact with the already mentioned contact surfaces 99 on the radial overhangs 82 on the first radial extensions 77. When in the installed position with respect to the piston mount 53 and the piston 55, the axial force stores 93 preferably assume a position in which they act in a prestressed manner on the contact surfaces 99 of the first radial extensions 77, and thus hold the piston 55 in contact with the piston mount 53, in a prestressed manner. In the installed position, the axial force stores 93 are preferably aligned tangentially and can enter a free space, which remains radially outside the shorter second radial extensions 79, thus saving space. In this position as shown in FIG. 2, the lever ends 97 of the axial force stores 93 make contact with the guides 103 of the first radial extensions 77 and at the same time are secured by the securing stud 101 against escaping radially outwards as a result of centrifugal forces.

As FIG. 2 likewise shows, the stud elements 91 which are held by the rivets 89 are aligned such that they engage essentially radially on the inside with studs 105, where they engage over the second radial extensions 79 with a predetermined amount of axial play 107. The studs 105 thus form axial movement limits in the event of any movement of the piston 55 away from the piston mount 53 against the influence of the axial force stores 93.

The described design results in the piston 55 not only being held on the piston mount 53 such that they rotate together but also being able to carry out only a limited movement with respect to the piston mount 53 in the axial direction. This limited axial relative movement occurs if the pressure in the pressure area 75 is higher than the pressure in the hydrodynamic circuit 30. When the pressure in the pressure area 75 is higher, the center hole 43 in the transmission input shaft 39 has increased pressure applied to it by means of an external pressure source, in which case this increased pressure can expand through the intermediate area 45, through the through-openings 49 in the housing hub 47 and via apertures 73 and the cutouts 81. Any pressure on the side of the piston 55 facing the pressure chamber 75 will be produced against the influence of the axial force stores 93 and will at least result in a reduction in the axial force on the friction linings 63 of the clutch disk 61, thus reducing the amount of torque that can be transmitted. Conversely, a reduction of the pressure in the pressure chamber 75 while the pressure in the hydrodynamic circuit 30 remains constant will result in a greater load on the piston 55, on its side facing the torsional oscillation damper 67, 50 that the axial force which is exerted by the piston 55 on the friction linings 63 will increase and the amount of torque which can be transmitted bV the bridging clutch 57 will rise.

Figure 4:
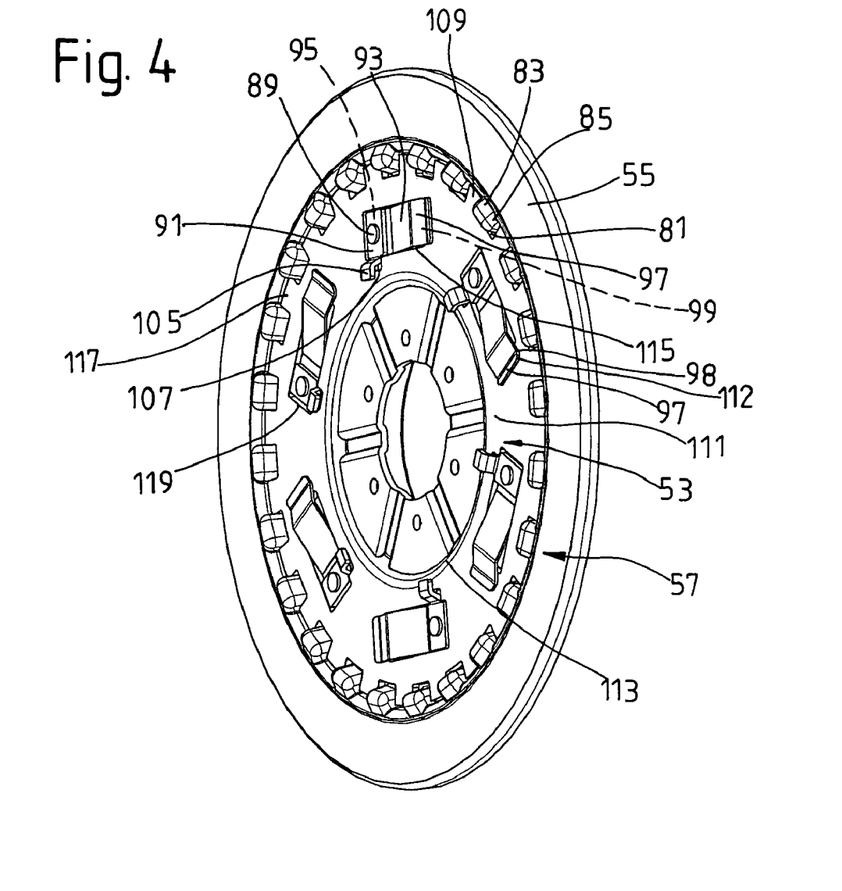
FIG. 4 is similar to FIG. 2, but with a different design configuration.

FIG. 4 shows another embodiment of the bridging clutch 57 in the area of the piston mount 53 and piston 55. In this embodiment, radial extensions 109 with essentially the same radial extent are provided on the radially outer edge 117 of the piston mount and each have a cutout 81 between them in the circumferential direction for a projection 83, which is provided in the same radial area, on the piston 55. To this extent, in this embodiment, the tooth system 85 on the piston 55 and the mating tooth system 86 on the piston mount 53 are arranged radially on the outside and surround an annular area 111 of the piston mount 53 in which the piston mount 53 is provided with recesses 115, which are used to hold axial force stores 93. The axial force stores 93 act with the pressure surfaces 98 at their lever ends 97 on the annular area 111, which thus includes the contact surfaces 112 which are required by the axial force stores. The studs 105 which are provided on the stud elements 91 also interact with the annular area 111 in that they limit the movement of the piston 55 away from the piston mount 53 in the axial direction, corresponding to the predefined axial play 107.

Figure 5:
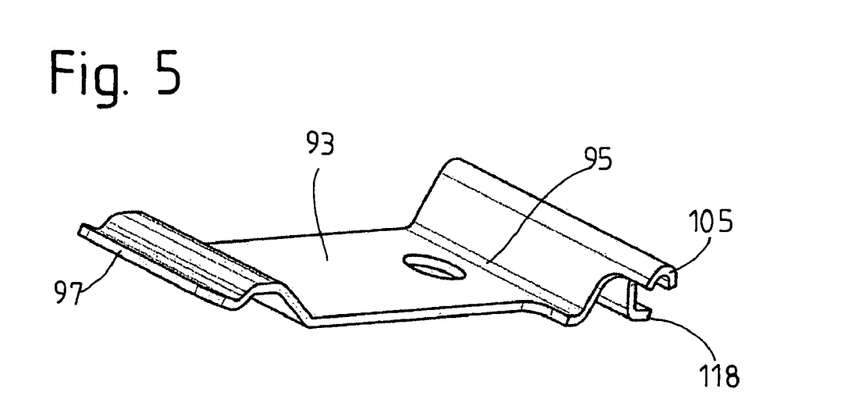
FIG. 5 shows an axial force store of the bridging clutch with an integrally formed securing stud.

FIG. 5 shows a specific refinement of an axial force store 93, in which the stud 105 is integrally formed at the connecting end 95 of the axial force store 93. This design refinement means that there is no need for a stud element that is separate from the axial force store 93. The axial force store 93 also has a tongue 118, which makes contact with in each case one edge 119 (which can be seen in FIG. 4) of the respective recess 115 and at least damps relative rotation deflections of the piston 55 with respect to the piston mount 53, resulting from play in the circumferential direction in the area of the tooth system 85/mating tooth system 86.

Figure 6:
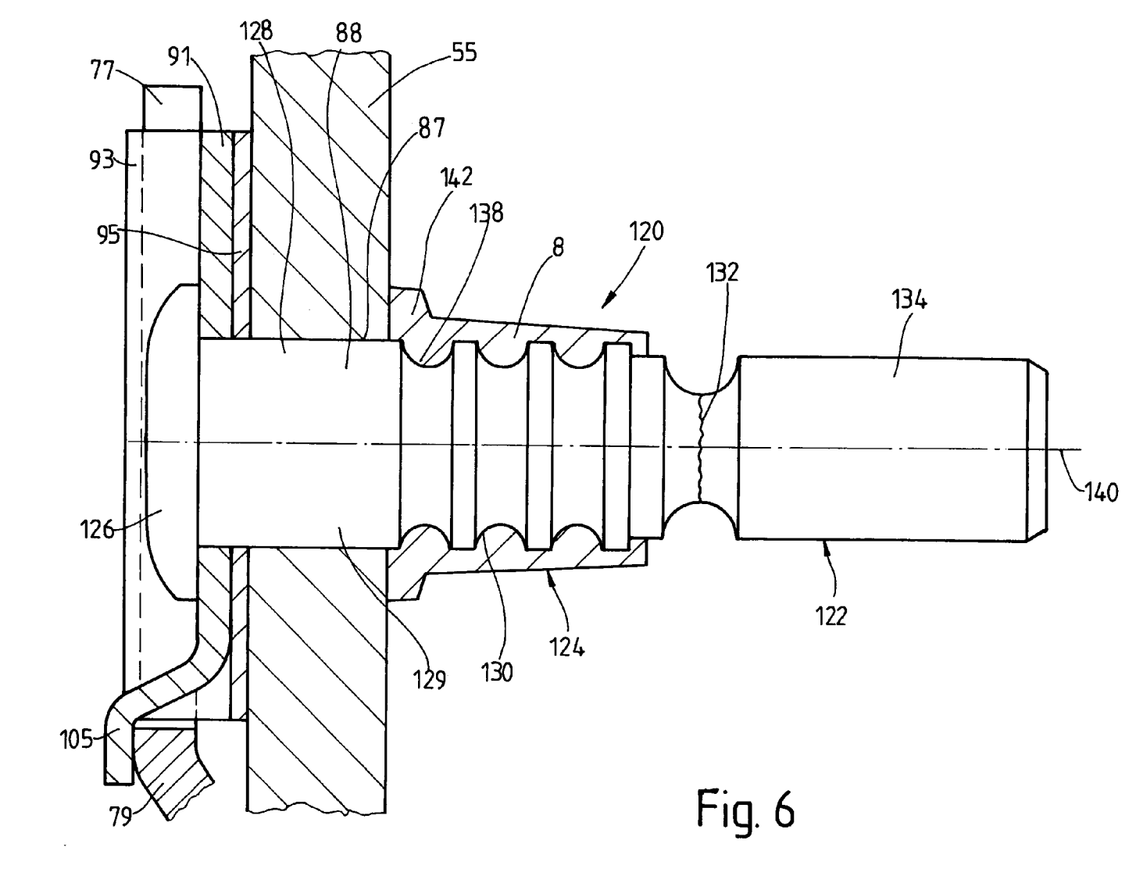
FIG. 6 shows an enlarged drawing of part of the area which is encircled by a dashed-dotted line in FIG. 1, but with a different attachment element.
Figure 7:
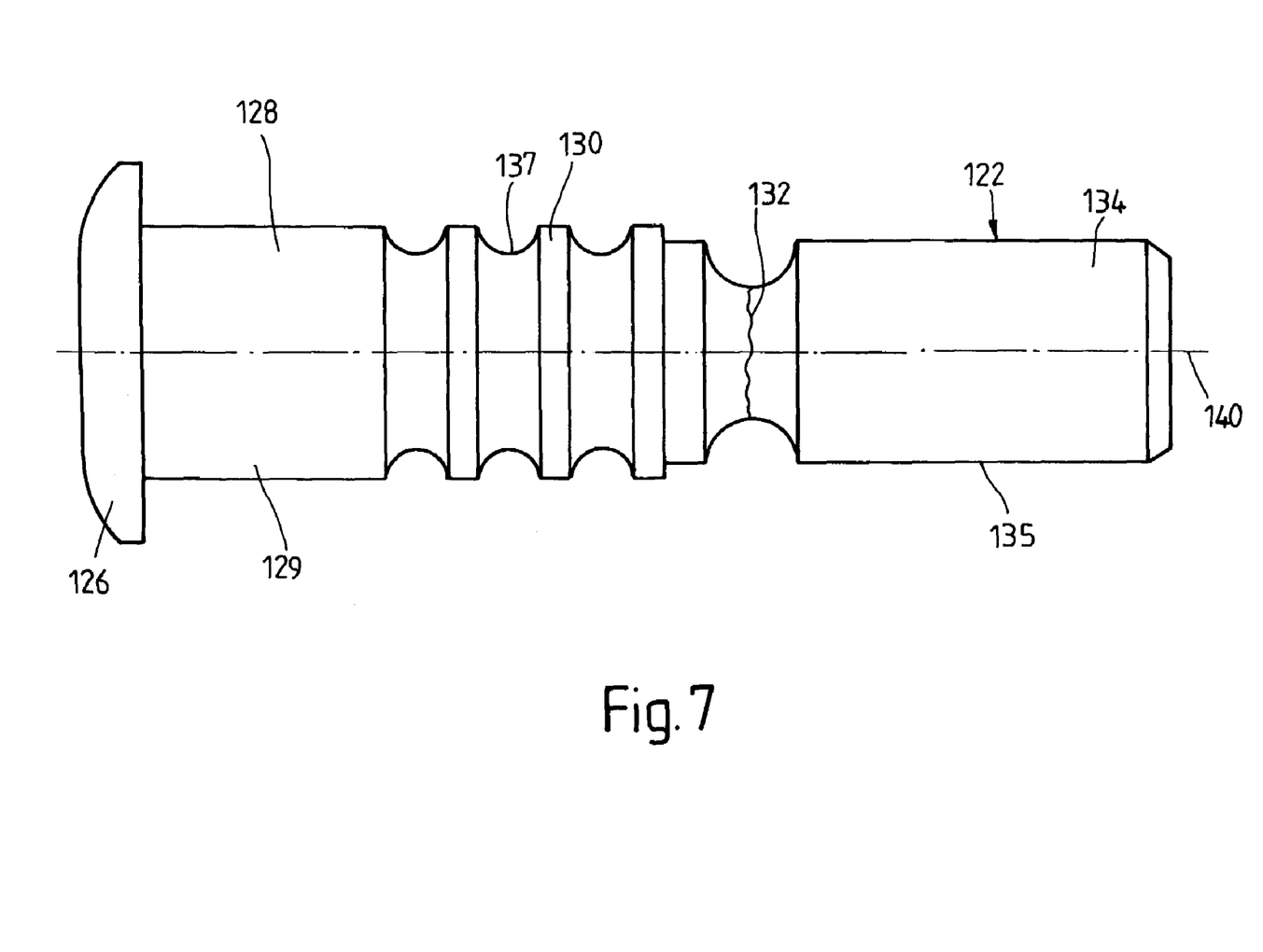
FIG. 7 shows a drawing of a part of a first component of the attachment element.

As FIG. 6 shows, the attachment elements 88 which are illustrated by way of example in the area surrounded by a dashed line in FIG. 1 may not only be in the form of rivets 89 but also in the form of locking ring bolts 120. Each locking ring bolt 120 comprises a profiled pin 122, which is shown in FIG. 7 and has a pin head 126 and a pin shank 128. The last-mentioned is split in the axial direction into a head area 129, a profiled area 130, a weak point 132 and a free pin end 134. The profiled pin 122 forms a first component of the locking ring bolt 120.

Figure 8:
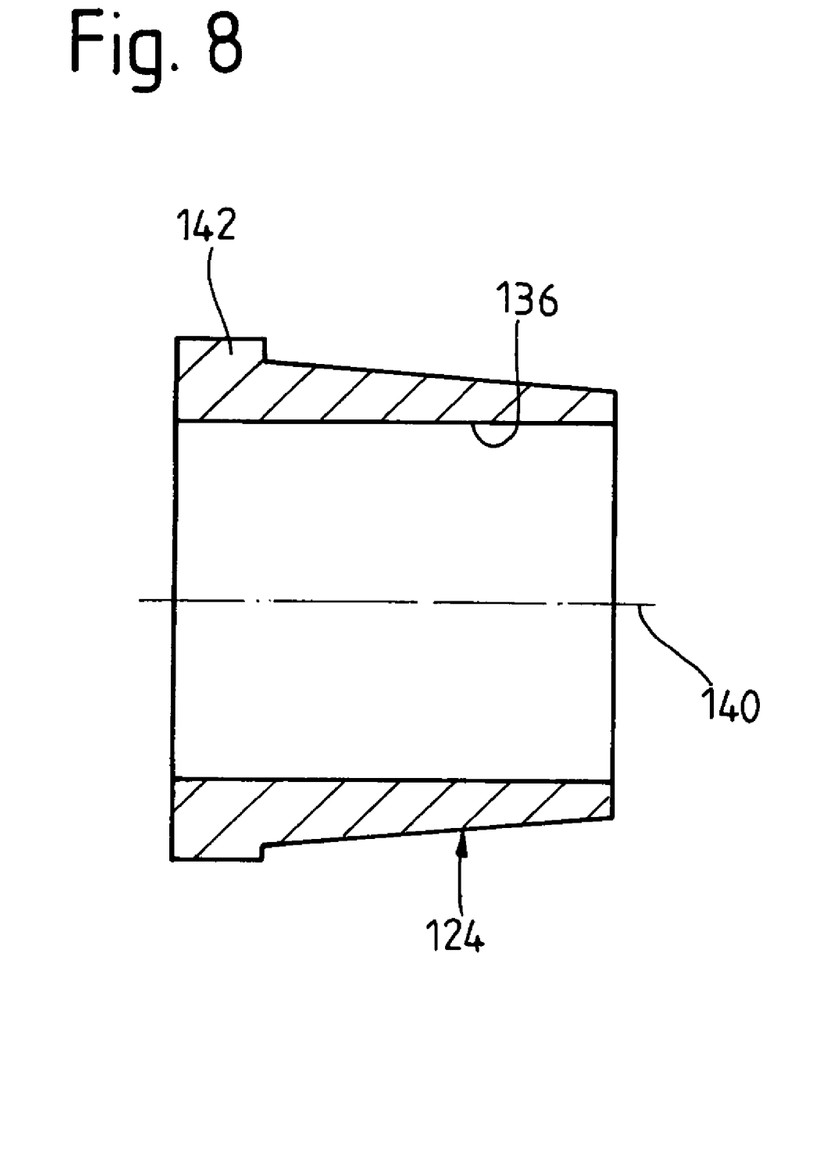
FIG. 8 shows a drawing of a part of a second component of the attachment element.

The sleeve 124 illustrated in FIG. 8 is used as a second component of the locking ring bolt 120 and, in front of a contact with the profiled pin 122, has an internal diameter 136 with an essentially smooth surface. At one of its free ends, the sleeve 124 is formed with a collar 142 which, as shown in FIG. 6, is intended to make contact with an adjacent component, in this case the piston 55. The sleeve 124 is rotationally symmetrical about a longitudinal axis 140, in the same way as the profiled pin 122.

Figures 9, 10:
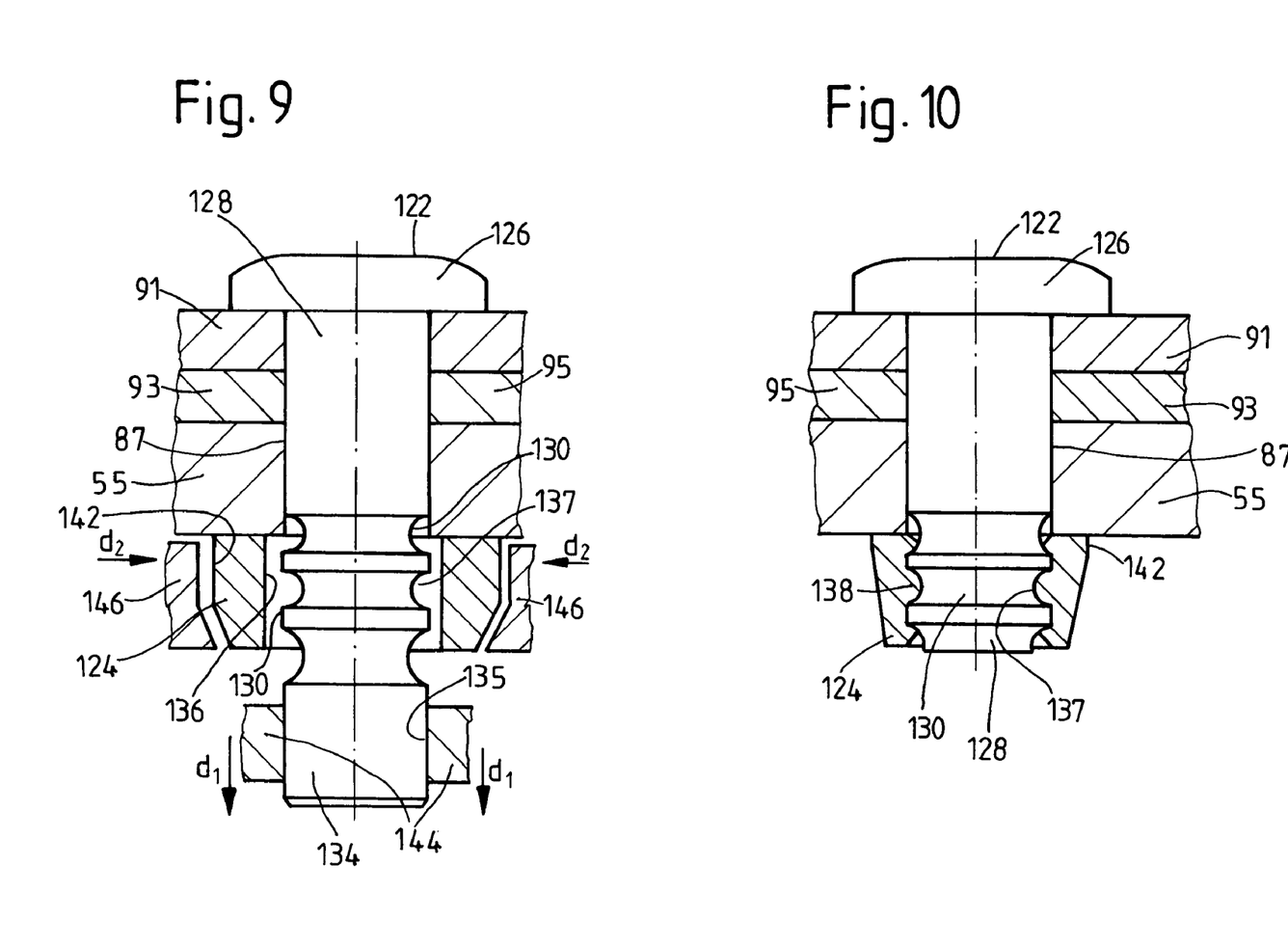
FIGS. 9, 10 show steps for connecting the two components from FIGS. 7 and 8 to one another.

FIGS. 6 and 10 show the locking ring bolt 120 in the finally installed position. For this purpose, as is shown in FIG. 9, the pin shank 128 of the profiled pin 122 is pushed through recesses both in the stud element 91 and in the connecting end 95 of the axial force store 93, and through in each case one retaining hole 87 in the piston 55, with the pin head 126 resting axially on the adjacent component, that is to say in this case on the stud element 91. The sleeve 124 is pushed over the pin shank 128 of the profiled pin 122 from the opposite side, that is to say from the side of the turbine wheel 29 in FIG. 1, with the internal diameter 136 of the sleeve 124 being arranged at a radial distance from the profiled area 130 of the pin shank 128. The sleeve 124 is in this case pushed in the direction of the pin head 126 until its collar 142 makes axial contact with the piston 55.

Positioned relative to one another in this way, first clamping jaws 144 of a machine tool which is not shown are clamped on the external diameter 135 of the free pin end 134 and, by moving in the direction $d_1$, cause the pin shank 128 to be lengthened. Second clamping jaws 146, which are likewise associated with a machine tool that is not shown, are then moved through a radial distance $d_2$, as a result of which the sleeve 124 is compressed radially until, as is shown in FIG. 10, it firmly encloses the pin shank 128. The deformation which takes place during this process causes material from the internal diameter 136 of the sleeve 124 to enter depressions 137 in the profiled area 130 of the profiled pin 122, so that the sleeve 124 is now also profiled 138 on its internal diameter. The interlocking engagement of the profiled area 130 on the profiled pin 122 with the profiling 138 on the sleeve 124 means that the sleeve 124 prevents the pin shank 128 from springing back completely when it is released by the first clamping jaws 144, so that the individual components, that is to say in this case the stud element 91, the axial force store 93 and the piston 55, are each connected to one another with a predetermined prestress.

The release (as already mentioned above) of the first clamping jaws 144 from the pin shank 128 does not take place by radial release of the free pin end 134 but, in fact, by applying an even greater tensile force in the direction $d_1$, until the free pin end 134 breaks off from the rest of the pin shank 128 at the weak point 132. The pin shank 128, which has been shortened axially in this way, is shown in FIG. 10. The second clamping jaws 146 also release the sleeve 124 by means of a radial reverse movement, at the latest after the free pin end 134 has been detached, so that the locking ring bolt 120 completes the connection of the components 91, 93 and 55 to one another.

The use of the locking ring bolts 120 as attachment elements 88 instead of the rivets 89 shown in FIG. 1 results in the following design advantage:

In the embodiment shown in FIG. 1, the rivet 89 must be compressed into the illustrated position by applying force at both ends in order to produce the connection 90. The connection 90 must accordingly have been produced first of all, before the piston mount 53 is attached by means of the connection 50 to the housing cover 19 of the clutch housing 5. In order to form the push-through riveting 51 for the connection 50, a tool must be held on the push-through riveting 51 from the side of the turbine wheel 29. The piston 55 may thus be pulled only so far radially inwards that a through-space remains radially within its piston foot 56 for the tool which is not shown but acts on the push-through riveting 51. In consequence, not only the turbine hub 35 but also the seal 59 must have a corresponding radial size.

Figure 11:
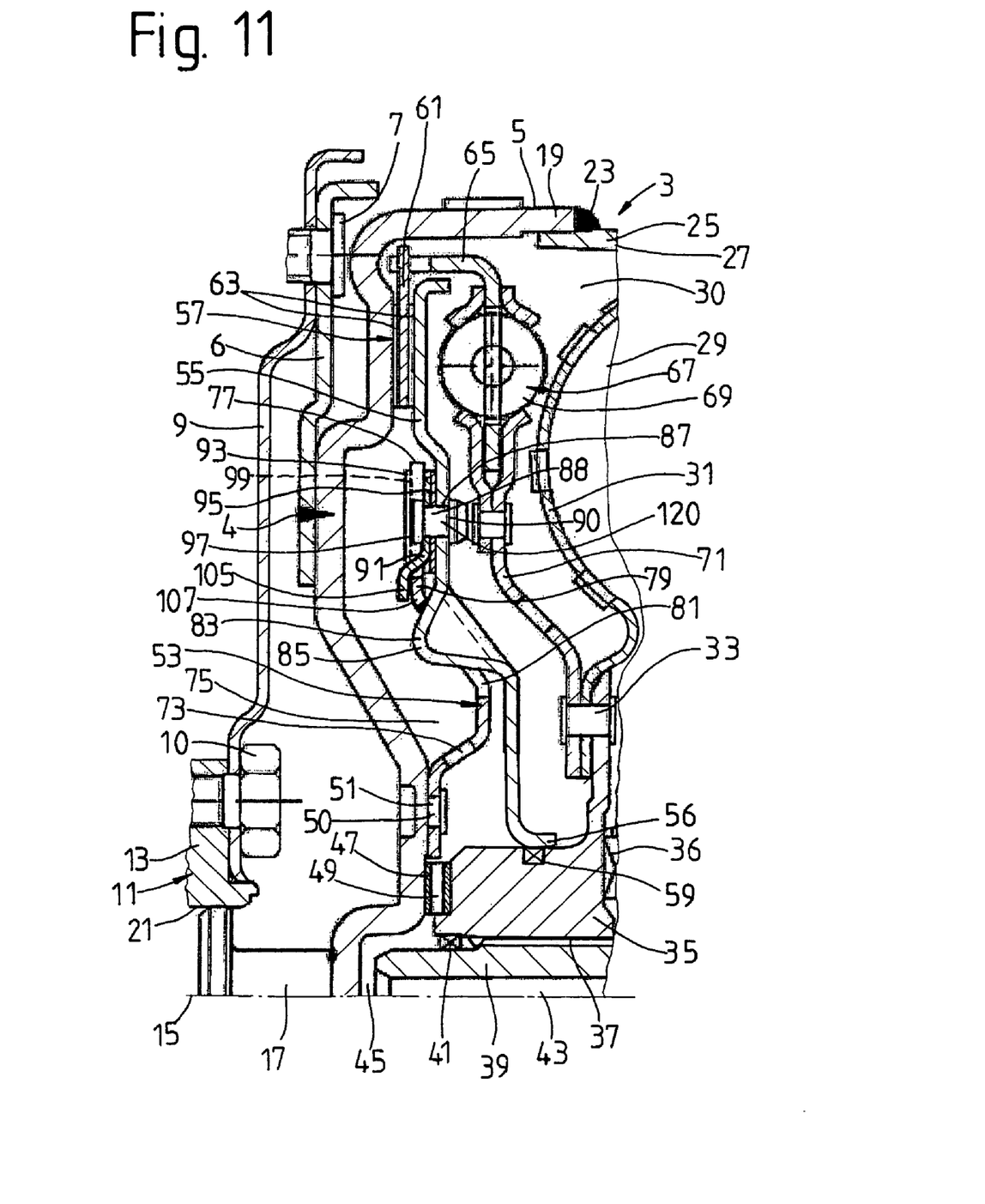
FIG. 11 is like FIG. 1, but with a piston configuration in the radially inner area that has been modified by the use of a different attachment element.

When using a locking ring bolt 120 as the attachment element 88, the assembly process is carried out solely from the side of the turbine wheel 29. This means that the connection 50 between the piston mount 53 and the housing cover 19 can be produced first of all, before the locking ring bolts 120 are also used to connect the stud element 91, the axial force store 93 and the piston 55. With this procedure, as is shown in FIG. 11, the piston 55 can be guided radially inwards without any problems as far as the connection 50, or else projecting beyond it, since this now need no longer be accessible for a tool. In consequence, the piston foot 56 is mounted and sealed on a considerably smaller radial diameter while making consistent use of the capabilities provided by the use of locking ring bolts 120, than could be done when using rivets 89 as the attachment elements 88. The locking ring bolts 120 thus assist the production of a low-cost and low-mass embodiment of the clutch apparatus 3, in particular in the area of the turbine hub 35.

The invention is not limited by the embodiments described above which are presented as examples only but can be modified in various ways within the scope of protection defined by the appended patent claims.

What is claimed is:

1. A bridging clutch for a clutch apparatus having a hydrodynamic circuit in a clutch housing, the bridging clutch comprising:
    a piston mount mounted on the clutch housing, the piston mount having radial extensions and cutouts between the radial extensions;
    a piston arranged on a hub coaxially with said mount and having a plurality of radial projections which are received in said cutouts; and
    a plurality of axial force stores having respective connecting ends fixed to the piston and respective lever ends engaging respective contact surfaces of the piston mount, said contact surfaces facing away from the piston, said axial force stores thereby prestressing said piston axially toward said piston mount.

2. The bridging clutch as claimed in claim 1, wherein the contact surfaces on the piston mount are provided on the radial extensions.

3. The bridging clutch as claimed in claim 2, wherein the radial extensions, comprise first and second radial extensions, the first radial extensions being longer than the second radial extensions and having the contact surfaces for the lever ends of the axial force stores.

4. The bridging clutch as claimed in claim 3, wherein the first radial extensions have securing studs for the lever ends of the axial force stores.

5. The bridging clutch as claimed in claim 4, wherein the first radial extensions are provided with a guide for the axial force stores, radially adjacent to the securing stud.

6. The bridging clutch as claimed in claim 3, wherein the second radial extensions end radially within the connecting end of the axial force stores on the piston.

7. The bridging clutch as claimed in claim 1 wherein the connecting ends of the axial force stores have associated stud elements for limiting axial play of the piston.

8. The bridging clutch as claimed in claim 7, wherein the stud elements are provided with studs which originate from the connecting end, point essentially in the direction of the second radial extensions on the piston mount, and engage behind them with predetermined axial play.

9. The bridging clutch as claimed in claim 7, wherein the contact surfaces of the piston mount are provided on an annular area, radially between a piston mount hub and the radial extensions on the piston mount.

10. The bridging clutch as claimed in claim 9, wherein the annular area has recesses for the axial force stores to pass through.

11. The bridging clutch as claimed in claim 10, wherein the recesses are provided to hold the stud elements.

12. The bridging clutch as claimed in claim 11, wherein the stud elements are provided with studs which, originate from the connecting ends of the axial force stores, engage behind the contact surface, which is provided on the annular area of the piston mount, with predetermined axial play.

13. The bridging clutch as claimed in claim 12, wherein the axial force stores are formed integrally with the studs.

14. The bridging clutch as claimed in claim 13, wherein each said axial force store comprises a tongue adjacent to the stud, each said tongue making contact with an adjacent edge of a respective said cutout.

15. The bridging clutch as claimed in claim 9, wherein two of the radial extensions bound every said cutout.

16. The bridging clutch as claimed in claim 9, wherein all the radial extensions have essentially the same radial extent.

17. The bridging clutch as claimed in claim 9, wherein the radial extensions form the radially outer edge of the piston mount.

18. The bridging clutch as claimed in claim 7, wherein attachment elements in the form of rivets pass through the stud elements and are attached to the piston.

19. The bridging clutch as claimed in claim 7, further comprising locking ring bolts which pass through the stud elements and engage behind the piston in order to produce a first connection.

20. The bridging clutch as claimed in claim 19, wherein the locking ring bolts are each formed with a profiled pin and a sleeve, the profiled pin having a pin head a pin shank with a profiled area, a weak point, and a free end.

21. The bridging clutch as claimed in claim 20, wherein the sleeve has an internal diameter without any profile prior to contact with the profiled pin, and profiling which is matched to the profiled pin is produced only by means of contact-dependent deformation of the sleeve.

22. The bridging clutch as claimed in claim 21, wherein the sleeve can be pushed onto the pin shank of the profiled pin for contact-dependent deformation, and, surrounding the pin shank, its internal diameter can be forced into depressions in the profiled area by radial force, which initiates deformation of the sleeve, in order to form its profiling.

23. The bridging clutch as claimed in claim 22, wherein an axial force can be applied to the pin shank of the profiled pin in a direction to the pin head during the process of connecting it to the sleeve, which axial force makes it possible to prestress the pin shank in the axial direction and makes it possible to disconnect the free end from the rest of the pin shank, along the weak point.

24. The bridging clutch as claimed in claim 20, wherein the pin shank springs back to a less prestressed extended position once the axial force has been removed, the pin shank having a collar which holds the sleeve prestressed in contact with a component connected by means of locking ring bolts to at least one other component the pin head making contact in a prestressed manner with one of these other components.

25. The bridging clutch as claimed in claim 1, wherein the first radial extensions alternate with the second radial extensions, each said cutout being provided in the piston mount between two said radial extensions.

26. The bridging clutch as claimed in claim 1, wherein the radial projections form a tooth system matched to the cutouts, which act as a mating tooth system in the piston mount, the projections engaging the cutouts with a predetermined amount of play in the circumferential direction.

27. The bridging clutch as claimed in claim 1, wherein the radial projections are forced out of the piston by material deformation.

28. The bridging clutch as claimed in claim 1, wherein the piston mount is mounted on a housing cover of the clutch housing.

29. The bridging clutch as claimed in claim 28, wherein the piston mount is mounted on the housing cover by means of push-through riveting.

30. The bridging clutch as claimed in claim 1 further comprising a turbine wheel having a turbine hub, the piston being arranged on the turbine hub.

31. The bridging clutch as claimed in claim 30, wherein the piston is connected via a clutch disk which provides additional friction surfaces to a torsional oscillation damper which is connected to the turbine hub such that they rotate together.

32. The bridging clutch as claimed in claim 1 further comprising locking ring bolts forming a first connection between the connecting end of one axial force store and the piston, wherein said first connection can be produced only after completion of a second connection between a housing cover of the clutch housing and the piston mount.

33. The bridging clutch as claimed in claim 32 wherein the piston comprises, a piston foot of the piston which can be drawn radially inside of the second connection.

* * * * *